No. 667,733. Patented Feb. 12, 1901.
R. F. PATMAN.
COTTON CHOPPER.
(Application filed Oct. 1, 1900.)

(No Model.)

Witnesses
Howard D. Orr.
J. W. Garner

Richard F. Patman, Inventor,
by C. A. Snow & Co.
Attorneys

THE NORRIS PETERS CO., PHOTO-LITHO., WASHINGTON, D. C.

UNITED STATES PATENT OFFICE.

RICHARD F. PATMAN, OF CALHOUN, GEORGIA.

COTTON-CHOPPER.

SPECIFICATION forming part of Letters Patent No. 667,733, dated February 12, 1901.

Application filed October 1, 1900. Serial No. 31,695. (No model.)

*To all whom it may concern:*

Be it known that I, RICHARD F. PATMAN, a citizen of the United States, residing at Calhoun, in the county of Gordon and State of Georgia, have invented a new and useful Cotton-Chopper, of which the following is a specification.

My invention is an improved cotton-chopper; and it consists in the peculiar construction and combination of devices hereinafter fully set forth, and pointed out in the claim.

Figure 1:
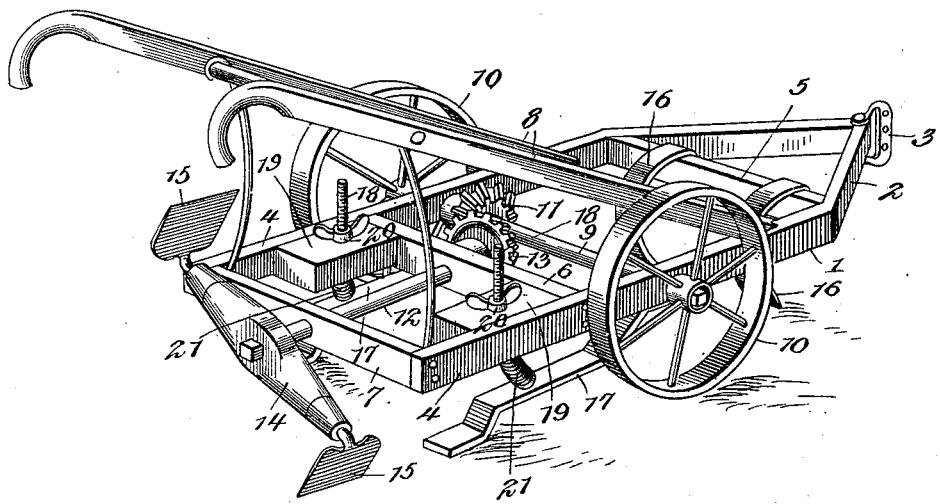
Figure 2:
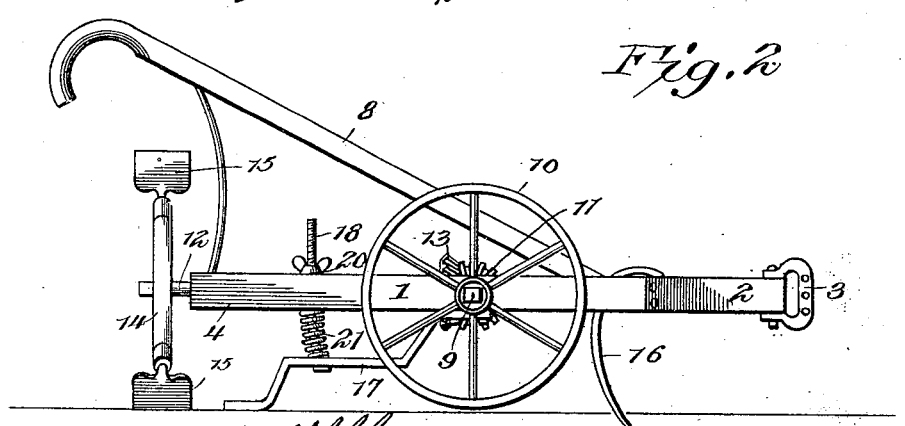
Figure 3:
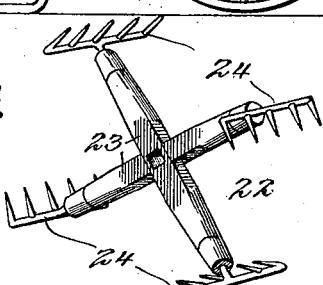

In the accompanying drawings, Figure 1 is a perspective view of a cotton-chopper embodying my improvements. Fig. 2 is a side elevation of the same. Fig. 3 is a detail perspective view of the revoluble rake for operating on young plants.

In the embodiment of my invention herein shown the frame 1 is of rectangular form and is provided at its front end with a V-shaped extension 2, which has the clevis 3. The frame 1 comprises the side bars 4, the front cross-bar 5, the intermediate cross-bar 6, and the rear cross-bar 7. Handles 8, which are of the usual form, are secured to the frame, as shown.

An axle-shaft 9 has its bearings in the side bars 4, and said shaft is provided at its ends with wheels 10. On the said shaft and fast thereto is a miter gear-wheel 11. A longitudinally-disposed shaft 12 has its bearings in the centers of the cross-bars 6 7. Said shaft has at its front end a miter gear-wheel 13, which engages the wheel 11, and to the rear end of the said shaft 12 is secured a bar 14, which is provided at its ends with chopping-hoes 15. It will be understood that when the machine is in motion rotary motion will be imparted to the shaft 12 and the chopping-hoes revolved thereby.

Spring cultivating-plows 16 are secured on the front cross-bar 5 and are adapted to engage the earth and operate on opposite sides of a cotton row. To the side bars 4, on the under sides thereof, are secured the front ends of runners 17, which bear at their rear ends on the earth on opposite sides of the cotton rows. Adjusting-screws 18, which are secured to the said runners near the rear ends thereof, operate in openings in blocks 19, which are secured on the inner sides of the bars 4, the said adjusting-screws being adapted to move vertically in the said openings in the said blocks. Adjusting-nuts 20 are provided for the said adjusting-screws and bear upon the upper sides of the said blocks, and on the lower portions of the said adjusting-screws are coiled extensile springs 21, which bear between the upper sides of the runners 17 and the lower sides of the blocks 19. By means of the said adjusting-screws and the said springs the runners may be so adjusted as to raise or lower the front end of the frame 1, and hence incline said frame as may be required to regulate the depth at which the chopping-hoes operate.

In Fig. 3 of the drawings I show a revoluble rake 22, which comprises the crossed bars 23 and the rakes 24 on the ends thereof. The said rake is adapted to be secured on the shaft 12 in lieu of the chopper shown in Figs. 1 and 2 and is especially adapted for operating on young plants.

Having thus described my invention, I claim—

A cotton-chopper comprising a frame having traction-wheels which support said frame, rearward-extending handles, a longitudinally-disposed shaft mounted in the said frame and geared to said driving-shaft, said longitudinally-disposed shaft carrying the choppers, runners supporting the rear end of the frame, adjusting-screws connecting the rear portions of said runners to said frame and springs bearing downward on said runners, said springs, adjusting-screws and runners coacting to set the said choppers for operation at any required depth, substantially as described.

In testimony that I claim the foregoing as my own I have hereto affixed my signature in the presence of two witnesses.

RICHARD F. PATMAN.

Witnesses:
   G. W. FULLER,
   O. N. STARR.